United States Patent
Harrison et al.

[11] Patent Number: 5,877,481
[45] Date of Patent: Mar. 2, 1999

[54] DOCUMENT DISPENSER WITH READING APERTURE FORMED IN DOCUMENT GUIDE

[75] Inventors: William Virgil Harrison, Beavercreek; Lance Edward Kelley, Springfield; John Henry Stolzenberg, New Carlisle, all of Ohio

[73] Assignee: The Standard Register Company, Dayton, Ohio

[21] Appl. No.: 710,378

[22] Filed: Sep. 16, 1996

[51] Int. Cl.⁶ .............. G06K 7/10; G06F 7/10; G06F 15/46

[52] U.S. Cl. .......... 235/375; 235/462; 235/483; 235/484; 235/437; 235/454

[58] Field of Search .................. 235/462, 483, 235/437, 484, 375, 454

[56] References Cited

U.S. PATENT DOCUMENTS

| | | | |
|---|---|---|---|
| 3,729,618 | 4/1973 | Drew et al. | 235/61.11 |
| 3,946,205 | 3/1976 | Melugin et al. | 235/61.11 |
| 4,660,221 | 4/1987 | Dlugos | 380/23 |
| 4,699,531 | 10/1987 | Ulinski, Sr. et al. | 400/74 |
| 4,879,456 | 11/1989 | Cherry et al. | 235/462 |
| 4,948,174 | 8/1990 | Thomson et al. | 283/58 |
| 4,974,878 | 12/1990 | Josephson | 283/67 |
| 5,008,520 | 4/1991 | Georgiou et al. | 235/462 |
| 5,025,139 | 6/1991 | Halliburton et al. | 235/379 |
| 5,157,243 | 10/1992 | Ramsey | 235/376 |
| 5,191,196 | 3/1993 | Mercede et al. | 235/484 |
| 5,196,679 | 3/1993 | Oshino | 235/437 |
| 5,229,587 | 7/1993 | Kimura et al. | 235/432 |
| 5,247,166 | 9/1993 | Cannon et al. | 250/208.1 |
| 5,336,876 | 8/1994 | Martinez Taylor | 235/475 |
| 5,377,271 | 12/1994 | Foreman et al. | 380/51 |
| 5,386,913 | 2/1995 | Taylor | 209/583 |
| 5,420,403 | 5/1995 | Allum et al. | 235/375 |
| 5,467,164 | 11/1995 | Wells et al. | 355/23 |
| 5,477,037 | 12/1995 | Berger | 235/379 |
| 5,513,117 | 4/1996 | Small | 364/479 |
| 5,570,960 | 11/1996 | Smith | 400/74 |
| 5,678,937 | 10/1997 | Smith | 400/78 |
| 5,684,286 | 11/1997 | Pierce | 235/454 |
| 5,708,261 | 1/1998 | Chen | 235/463 |

*Primary Examiner*—Anita Pellman Gross
*Assistant Examiner*—Douglas X. Rodriguez
*Attorney, Agent, or Firm*—Killworth, Gottman, Hagan & Schaeff LLP

[57] ABSTRACT

A document dispenser comprises a document guide defining a guide portion of an advancing document path and a document identification code reading aperture formed in the document guide wherein a single detector in communication with the dispenser controller is positioned proximate the document identification code reading aperture and is operative to read a specific document identification code through the document identification code reading aperture. Correlated data, indicative of a specific document identification code and corresponding document data input during dispensing of a document carrying the specific document identification code, is generated subsequent the reading of the identification code. A plurality of alternative document identification code reading apertures are formed in the document guide.

10 Claims, 3 Drawing Sheets

DOCUMENT DISPENSER WITH READING APERTURE FORMED IN DOCUMENT GUIDE

BACKGROUND OF THE INVENTION

The present invention relates to document dispensers. Specifically, the present invention relates to document dispensers used to generate documents carrying data designated at the dispenser or data designated elsewhere and transmitted to the dispenser.

A money order dispenser is an example of a document dispenser wherein data is designated at the dispenser and reproduced on the face of a document contained in the dispenser. For example, a money order amount is often designated on a dispenser keyboard and imprinted on the face of the document. In the case of money orders, the amount for which a specific money order has been issued must be accurately reported to facilitate proper reconciliation of money orders issued and money orders cashed. Further, it may be necessary to verify that the present amount shown on the face of the money order corresponds to the amount for which it was originally issued in order to detect possible fraud or other security violations. Similar concerns apply to document dispensers in general.

One prior art money order dispenser incorporates four optical readers used to read a four bit binary number present on the face of the money order. Each optical reader reads a separate binary coded digit of the money order serial number. This dispenser does not provide a means by which an industry standard bar code present on the money order may be read. Further, the prior art dispenser may be too costly and too difficult to produce and maintain because four optical scanners and corresponding scanner circuitry must be utilized. The prior art dispenser's use of four optical scanners also presents a significant design obstacle because each of its optical readers must be accurately aligned with the corresponding coded digit on the document to be dispensed.

Accordingly, there is a need for a document dispenser which ensures document data integrity through detection of an encoded document identification number, preferably an industry standard bar code, while providing for a relatively simple, cost effective, and reliable identification number detecting arrangement.

SUMMARY OF THE INVENTION

This need is met by the present invention wherein a document dispenser embodies a single identification number detector which is preferably operative to read an industry standard bar code present on the face of the document while the document is advanced through a document printer. The document dispenser correlates the bar coded serial number of the document with a face value of the document or other data present on the face of the document.

In accordance with one embodiment the present invention, a document dispenser is provided comprising: a dispenser controller; a document data input device in communication with the dispenser controller; a document guide defining an advancing document path; a document data printing mechanism positioned along the advancing document path; a single detector in communication with the dispenser controller, positioned along the advancing document path, and operative to read a complete set of discrete data portions of a specific document identification code; a document data memory in communication with the dispenser controller; and, a document identification code memory in communication with the dispenser controller.

The dispenser controller is preferably operative to generate correlated data indicative of specific document data input at the document data input device during dispensing of a document carrying a specific document identification code. The specific document identification code preferably corresponds to a document serial number and the specific document data preferably corresponds to a value of the document carrying the specific document identification code. The dispenser preferably further comprises a correlated data output wherein the correlated data output comprises a member selected from the group consisting of a correlated data printer, a correlated data display, and a correlated data output port.

The single detector may be operative to sequentially read each discrete data portion and may read the specific document identification code as the specific document identification code passes through an identification code reading position. The detector may comprise a stationary detector, e.g. a bar code reader. The detector may comprise a stationary beam optical reader or a moving beam optical reader. The single detector is preferably positioned along the guide portion of the advancing document path. The document identification code may comprise an industry standard identification code.

In accordance with another embodiment the present invention, a method of dispensing documents is provided comprising the steps of: inputting document data at a document dispenser; advancing a document along a document advancing path including a document guide of the document dispenser, an identification code reading position of the document dispenser, and a printing mechanism; reading a complete set of discrete data portions of a document identification code at the identification code reading position with a single detector; storing a signal indicative of the document identification code; storing the document data; and generating correlated data indicative of a specific document identification code and corresponding document data input during dispensing of a document carrying the specific document identification code.

The discrete data portions may be read as the document identification code passes through the identification code reading position and the document guide and/or may be read sequentially. The step of reading a document identification code may comprise reading the identification code with a stationary beam optical reader or a moving beam optical reader. The specific document identification code preferably corresponds to a document serial number and the corresponding document data preferably corresponds to a value of the document carrying the specific document identification code. The step of reading a document identification code may comprise reading an industry standard identification code.

In accordance with yet another embodiment the present invention, a document dispenser is provided comprising: a dispenser controller; a document data input device in communication with the dispenser controller; a document guide defining a guide portion of an advancing document path; a document identification code reading aperture formed in the document guide; a document data printing mechanism positioned along the advancing document path; a detector in communication with the dispenser controller, positioned proximate the document identification code reading aperture, and operative to read a specific document identification code through the document identification code reading aperture; a document data memory in communication with the dispenser controller; a document identification code memory in communication with the dispenser controller.

The document guide preferably comprises a pair of opposed guide surfaces positioned such that the guide portion of the advancing document path lies between the pair of opposed guide surfaces, and the document identification code reading aperture is preferably formed in one of the opposed guide surfaces. A plurality of alternative document identification code reading apertures may be formed in the pair of opposed guide surfaces. The pair of opposed guide surfaces preferably lie in parallel guide surface planes, and a distance between the guide surface planes is preferably such that a document positioned along the guide portion of the advancing document path lies substantially parallel to the parallel guide surface planes.

The detector is preferably operative to read the specific document identification code as the specific document identification code passes through the identification code reading aperture. The detector is preferably operative to read a complete set of discrete data portions of a specific document identification code, and may sequentially read the complete set of discrete data portions of a specific document identification code. The detector may comprise a stationary beam optical reader or a moving beam optical reader.

The dispenser preferably further comprises a detector mount adapted to removably support the detector, such that the detector is positionable proximate the document identification code reading aperture, and at least one alternative detector mount adapted to removably support the detector, such that the detector assembly is positionable proximate the at least one alternative document identification code reading aperture.

Accordingly, it is an object of the present invention to provide a versatile document dispenser of relatively simple design which protects data integrity and avoids dispenser malfunctions.

DETAILED DESCRIPTION OF THE INVENTION

Figure 1:
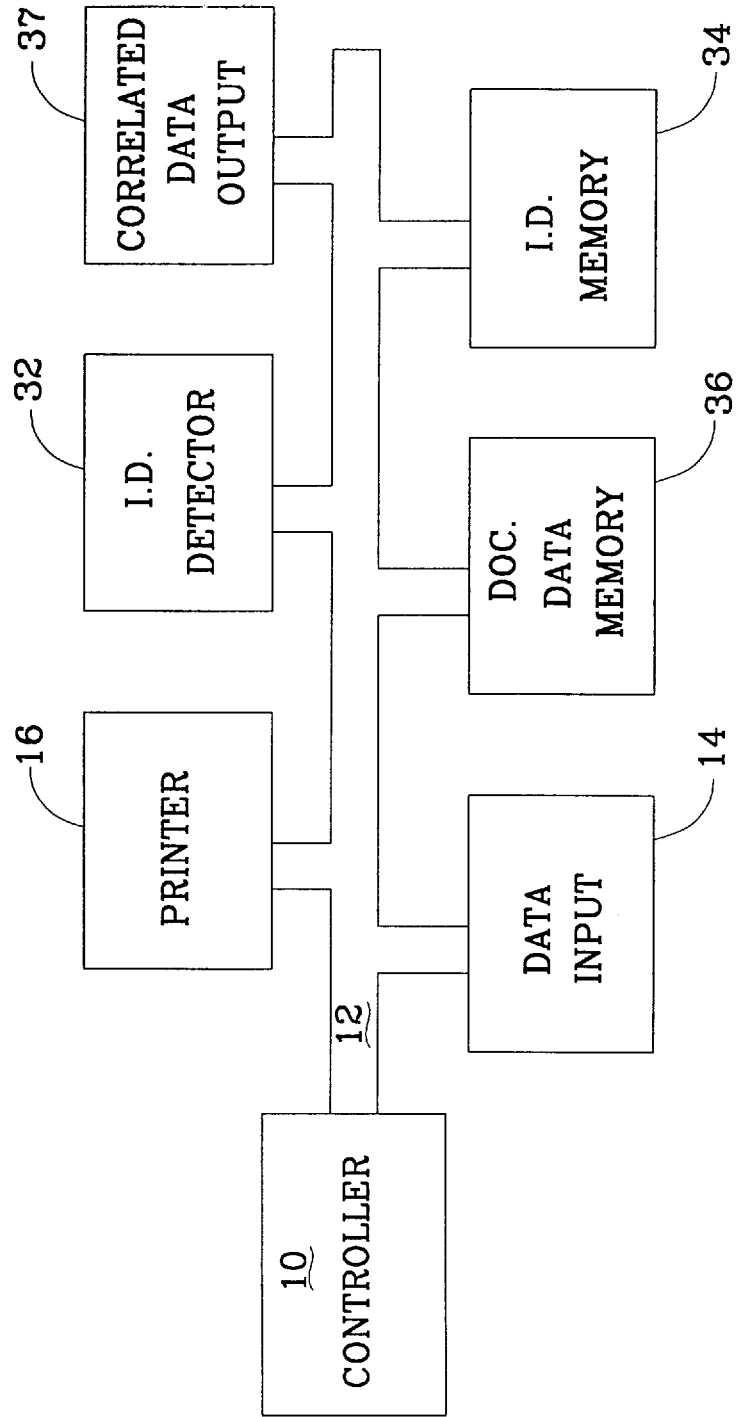
FIG. 1 is a schematic block diagram of the electronic components of a document dispenser according to the present.

The document dispenser according to the present invention will be described with reference to FIGS. 1, 2A, and 2B. A dispenser controller 10, preferably including a central processing unit (CPU) and an associated controller memory (not shown), is coupled to data, address, and control buses, represented generally by the digital bus 12. A document data input device 14 and a document data printer 16 are in communication with the digital controller 10 via the digital bus 12 and are controlled thereby according to various operating and 6 applications programs resident in the controller memory. Data processed by the digital controller 10 is also stored in the associated controller memory.

The document data input device 14 typically comprises a data communications port, a keypad, or a keyboard. A dispenser operator selects a set of document variable values according to the requirements of the particular document to be dispensed and enters the selected values at the data input device 14. For example, in the event the document dispenser is utilized to dispense money orders, the operator will typically select a money order amount, a payor name, a payee name, a document date, etc. The selected values are then entered at the document data input device 14 and subsequently reproduced on the document by the document data printer 16.

Figure 2A:
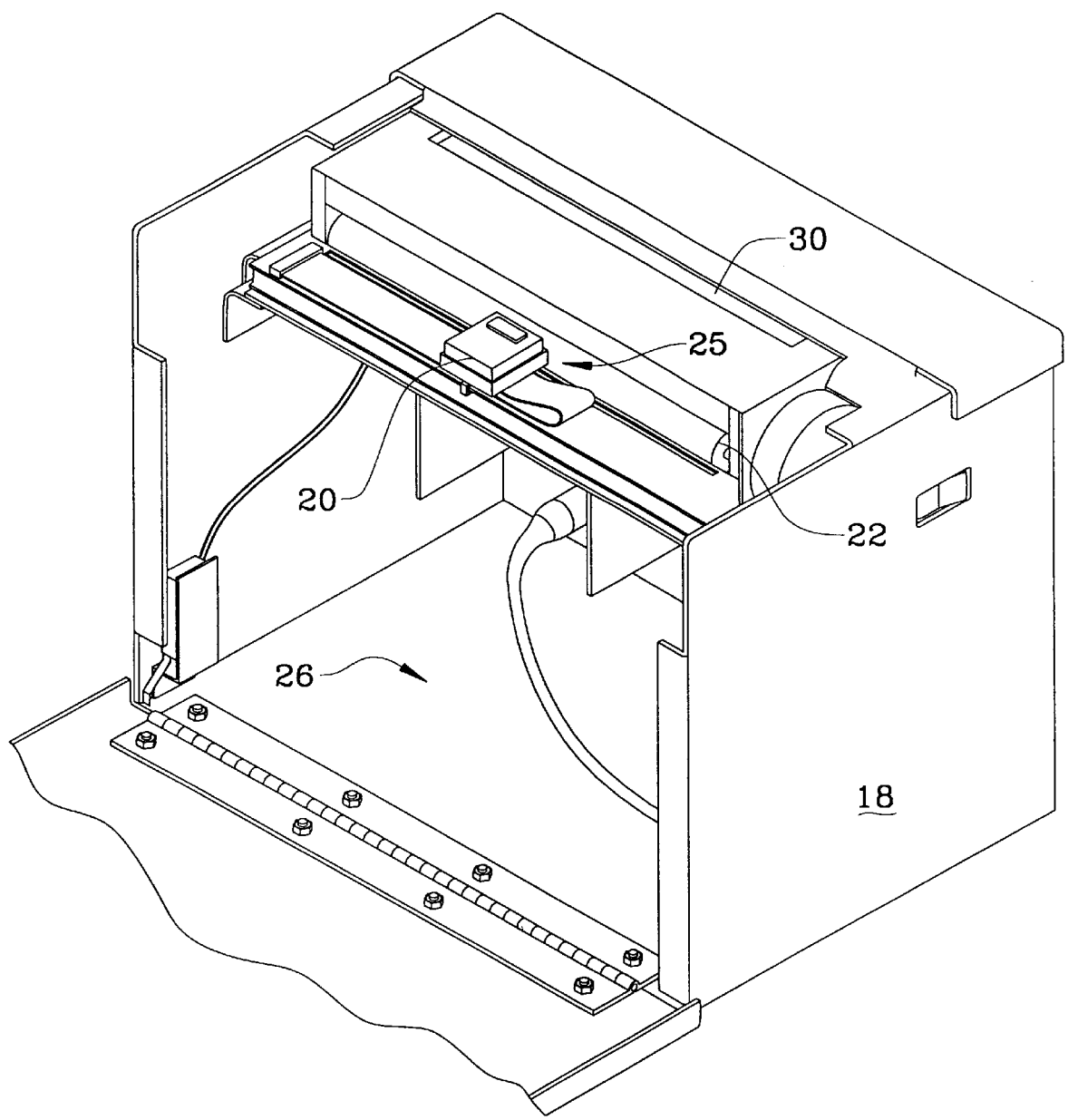
FIGS. 2A and 2B are an illustration of the mechanical components positioned along a document path of a document dispenser according to the present invention.
Figure 2B:
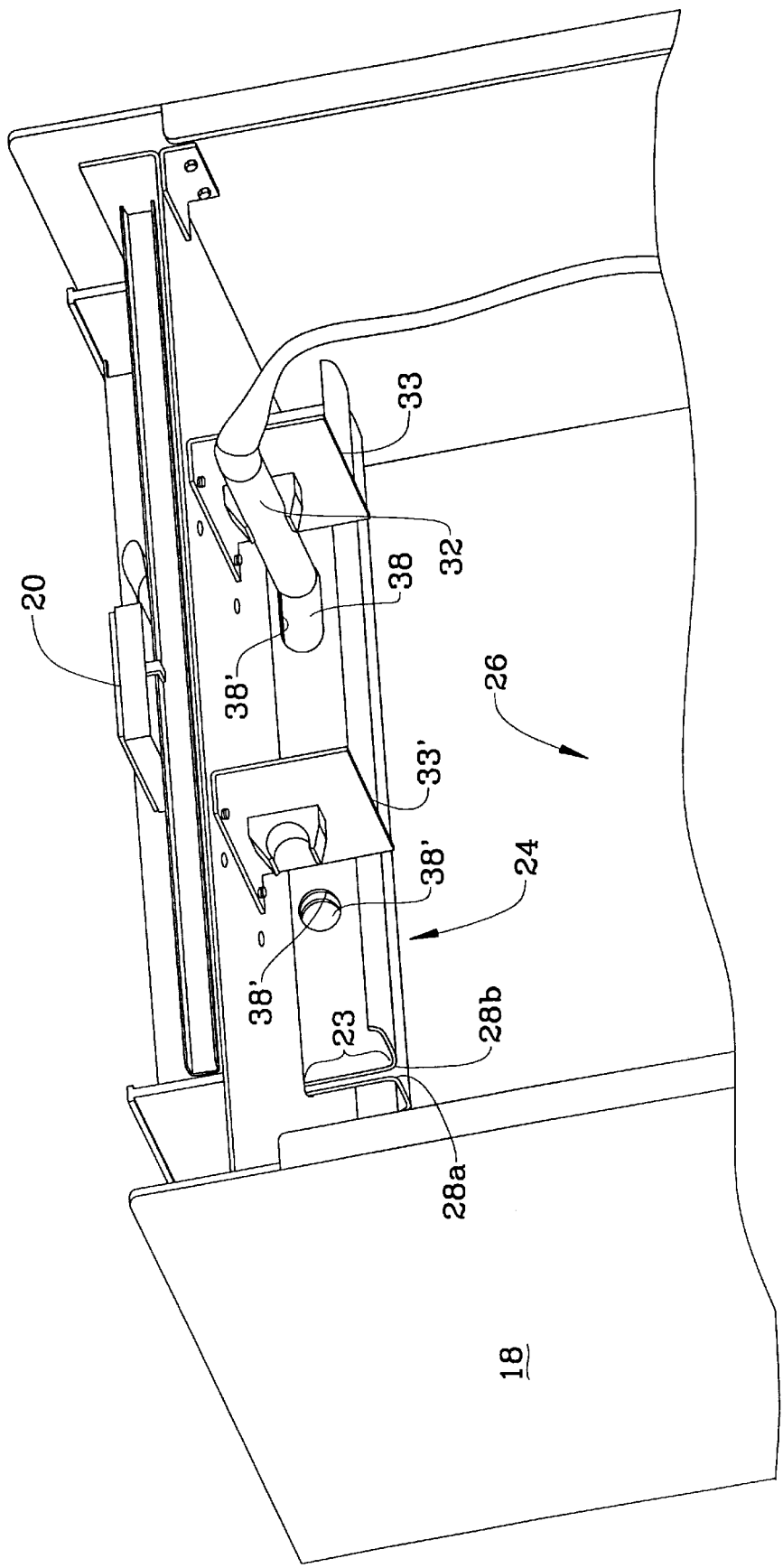

The document data printer 16, illustrated in further detail in FIGS. 2A and 2B, is positioned in a dispenser chassis 18 and includes a movable print head 20 and a printer roller 22. A document guide 24 is also mounted within the dispenser chassis 18. An advancing document path extends from a document supply area 26 of the dispenser chassis 18, along a guide portion 23 of the document path between a pair of opposed guide surfaces 28a, 28b of the document guide 24, through a printer portion 25 of the advancing document path between the movable print head 20 and the printer roller 22, and through a document feeder slot 30 to the exterior of the dispenser chassis 18.

A single document identification code detector 32 is provided in communication with the dispenser controller 10, positioned along the guide portion 23 of the advancing document path, and operative to read a complete set of discrete data portions of a specific document identification code present on a document to be dispensed. Specifically, the single detector 32 sequentially reads discrete data portions of the identification code as the specific document identification code passes through an identification code reading position. It is contemplated by the present invention that the single detector 32 may be a moving beam optical reader or a stationary beam optical reader and may comprise a contact or non-contact scanner. Further, it is contemplated that, where a moving beam optical reader is utilized, and where the range of movement of the beam is such that the beam traverses the entire span of the identification code, it will not be necessary for the detector 32 to read the discrete data portions of the identification code as the specific document identification code passes through the identification code reading position. The single detector 32 and the controller 10 are programmable to selectively read a variety of coded symbols, including industry standard bar codes and customized codes. It is also contemplated by the present invention that the single detector is operative to read a coded symbol including discrete data portions arranged in a continuous sequence, separated by inter-character gaps, and/or arranged so as to be readable bi-directionally.

A document identification code read by the single detector 32 is transferred to an identification code memory 34 in communication with the dispenser controller 10. Similarly, document data entered at the document data input device 14 is transferred to a document data memory 36 in communication with the dispenser controller 10. The dispenser controller 10 uses the stored identification codes and the stored document data to generate correlated data indicative of the specific document data input at the document data input device during dispensing of a document carrying a specific document identification code. Preferably, the specific document identification code corresponds to a document serial number and the specific document data corresponds to a value of the document carrying the specific document identification code. The controller 10 is further operative to generate a correlated data output at a correlated data output device 37 associating the identity of a single dispensed document and its corresponding document data or the identity of a plurality of dispensed documents and the corresponding document data for each of the plurality of documents. The correlated data output device 37 preferably comprises a member selected from the group consisting of a correlated data printer, a correlated data display, and a correlated data output port.

As is illustrated in FIG. 2B, a document identification code reading aperture 38 is formed in the document guide 24 so as to define the identification code reading position. The detector 32 is positioned proximate the document identification code reading aperture 38 so as to read the document identification code through the document identification code reading aperture 38. A detector mount 33 is secured to the chassis 18 and is adapted to removably support the detector 32 such that the detector 32 is positionable proximate the document identification code reading aperture 38. It is contemplated by the present invention that clips, magnets, Velcro™ tape, temporary adhesives, and any mechanical mount that permits removal of an object mounted thereto could be utilized according to the present invention to removably support the detector 32.

The pair of opposed guide surfaces 28a and 28b lie in parallel guide surface planes, and a distance between the guide surface planes is such that a document positioned along the guide portion 23 of the advancing document path lies substantially parallel to the parallel guide surface planes. Specifically, a document positioned along the guide portion 23 of the advancing document path lies substantially parallel to the parallel guide surface planes because the document has a given stiffness or rigidity and because the guide surfaces are spaced closely adjacent one another. Preferably, where a document of 0.003 to 0.006 inch (0.0076 to 0.015 mm) thickness is dispensed, the guide surfaces are spaced apart by approximately 0.050 to 0.080 inches (1.27 to 2.03 mm). The document is described as lying substantially parallel to the parallel guide surface planes, as opposed to exactly parallel, because, the document will deviate from an exactly parallel path according to the spacing of the guide surfaces and the stiffness or rigidity of the document.

Alternative document identification code reading apertures 38' are formed in the pair of opposed guide surfaces 28a and 28b of the document guide 24. Further, alternative detector mounts 33' (only one shown) are provided to removably support the detector such that the detector assembly may be moved from the detector mount 33 and secured in a position proximate one of the alternative document identification code reading apertures 38'. Accordingly, with appropriate placement of the alternative reading apertures 38', the dispenser of the present invention is able to read document identification codes of a variety of documents wherein each document type carries an identification code in a different position than a previously dispensed document. Specifically, with reference to the alternative reading apertures 38' shown in FIG. 2A, by moving the detector to an alternative detector mount 33', the dispenser is able to read identification codes in four different positions, two on the front of the document and two on the back of the document.

Having described the invention in detail and by reference to preferred embodiments thereof, it will be apparent that modifications and variations are possible without departing from the scope of the invention defined in the appended claims.

What is claimed is:

1. A document dispenser comprising:
    a dispenser controller;
    a document data input device in communication with said dispenser controller;
    a document guide defining a guide portion of an advancing document path wherein said document guide comprises a pair of opposed guide surfaces positioned such that said guide portion of said advancing document path lies between said pair of opposed guide surfaces;
    a document identification code reading aperture formed in at least one of said opposed guide surfaces;
    a document data printing mechanism positioned along a printer portion of said advancing document path;
    a detector in communication with said dispenser controller, positioned proximate said document identification code reading aperture, and operative to read a specific document identification code through said document identification code reading aperture;
    a document data memory in communication with said dispenser controller; and,
    a document identification code memory in communication with said dispenser controller.

2. A document dispenser as claimed in claim 1 wherein at least one alternative document identification code reading aperture is formed in at least one of said pair of opposed guide surfaces.

3. A document dispenser as claimed in claim 2 wherein said dispenser further comprises:
    a detector mount adapted to support said detector such that said detector is positionable proximate said document identification code reading aperture; and,
    at least one alternative detector mount adapted to support said detector such that said detector assembly is positionable proximate said at least one alternative document identification code reading aperture.

4. A document dispenser as claimed in claim 1 wherein said detector is operative to read said specific document identification code as said specific document identification code passes through said identification code reading aperture.

5. A document dispenser as claimed in claim 1 wherein said detector is operative to read a complete set of discrete data portions of a specific document identification code.

6. A document dispenser as claimed in claim 1 wherein said detector is operative to sequentially read a complete set of discrete data portions of a specific document identification code.

7. A document dispenser as claimed in claim 1, wherein said detector comprises a stationary beam optical reader.

8. A document dispenser as claimed in claim 1, wherein said detector comprises a moving beam optical reader.

9. A document dispenser comprising:
    a dispenser controller;
    a document guide defining a guide portion of an advancing document path wherein said document guide comprises a pair of opposed guide surfaces positioned such that said guide portion of said advancing document path lies between said pair of opposed guide surfaces, wherein said pair of opposed guide surfaces lie in parallel guide surface planes, and wherein a distance between said guide surface planes is such that a document positioned along said guide portion of said advancing document path lies substantially parallel to said parallel guide surface planes;
    a reading aperture formed in at least one of said opposed guide surfaces;
    a document data printing mechanism positioned along said printer portion of said advancing document path; and
    a detector in communication with said dispenser controller and positioned proximate said reading aperture.

10. A document dispenser comprising:
    a dispenser controller;
    a document guide defining a guide portion of an advancing document path wherein said document guide comprises a pair of opposed, substantially parallel, and substantially planar guide surfaces positioned such that said guide portion of said advancing document path lies between said pair of opposed guide surfaces;

a reading aperture formed in at least one of said opposed guide surfaces;

a document data printing mechanism positioned along a printer portion of said advancing document path;

a detector in communication with said dispenser controller, positioned proximate said reading aperture, and operative to read data through said reading aperture; and a data memory in communication with said dispenser controller.

* * * * *